United States Patent Office 3,564,395
Patented Feb. 16, 1971

3,564,395
DIRECT-CURRENT TRANSFORMER HAVING A SINGLE COMMON MAGNETIC CIRCUIT

Hans Hieronymus and Hans Martens, Erlangen, Germany, assignors to Siemens Aktiengesellschaft, Berlin, Germany Filed June 28, 1968, Ser. No. 741,161
Claims priority, application Germany, July 1, 1967, S 110,634
Int. Cl. H02p 13/04
U.S. Cl. 323—44 10 Claims

ABSTRACT OF THE DISCLOSURE

A device for transforming direct current comprises a single magnetic circuit which has a variable magnetic field in which the galvanomagnetic resistance members of a bridge network are located. The magnetic circuit has winding means for providing the controlling field excitation in dependence upon the direct current to be transformed. A direct-current amplifier has its input connected to the bridge network and has its output circuit in negative feedback connection with the winding means to provide the magnetic circuit with feedback excitation opposed to the controlling excitation. The magnetic circuit is at least in part magnetically saturable at magnitudes of the feedback excitation above predetermined limit value.

Our invention relates to devices for transforming direct current, such devices being briefly called "direct-current transformers."

It is often necessary to measure or transform currents and voltages in a "potential free manner." For example, if the current or voltage to be measured is at a very high or dangerous potential, the measuring circuit itself is supposed to be galvanically isolated so that it cannot assume the high potential obtaining in the circuit under investigation. Such isolation poses no problem as far as alternating currents and alternating voltages are concerned because ordinary transformers, in which a primary circuit is inductively coupled with the secondary circuit, provide the desired isolation. However, direct-current and direct-voltages must also be measured or transformed by potential free devices and these are considerably more complicated than alternating-current transformers because a transformation on the induction principle is not applicable. Accordingly, there has been a persistent need for such purposes as controlling and regulating techniques for simplified DC transformer devices.

Semiconductor apparatus for measuring, controlling and/or regulating, such as, for example, multiplying devices or direct-current converters, have been equipped with galvanomagnetic resistors such as the so-called "field plates" (Solid State Electronics, Pergamon Press, 1964, No. 7, pages 363 to 371, and 1966, No. 9, 443, 451). The field plates in such a device are galvanically isolated from the direct current which excites the magnetic field to which the field plate is subjected. Direct-current transformers of this type have been equipped with cup-core magnets about whose core the control winding was placed, this winding being traversed by the direct-current to be transformed. The galvanomagnetic material was disposed between the cup rim and the cover. Used as such galvanomagnetic material, has been bismuth (see for example Archive der elektr. Übertragung 1954, No. 8, pages 269 to 278, particularly page 276). Ring-core magnets have also been used in lieu of the cup-core magnet, such ring-core magnets comprising three legs joined by two yokes. The excitation winding can be placed upon the middle leg. The two other legs form gaps in which respective field plates are accommodated and are excited not only from the excitation field produced by the direct current under observation, but also by a bias excitation produced by means of premagnetizing windings (Electronic Engineering, November 1958, pages 664 and 666).

The bias premagnetization of the field plates, which may be effected by permanent magnets or electromagnetically, is needed if the operation is to take place in the linear portion of the resistance characteristic of the galvanomagnetic resistor. The characteristic is approximately square for small values of magnetic fields. By applying a premagnetizing bias of a few kilogauss (kg.), for example, about 3 to 5 kg., the working point of the field plate can be shifted into the linear region of its resistance characteristic. The direct current to be measured can then be directly read from a linear resistance scale of indicia. Aside from such linearization, the premagnetized bias has the advantage that the field plate is considerably more sensitive in the linear region of the characteristic than in the quadratic region.

Despite linearization and increased sensitivity of direct-current or direct-voltage modulators, the measurnig result may exhibit the faults stemming, for example, from spurious fields. For minimizing such faults, it has been found favorable to apply, aside from the controlling excitation provided by the direct-current or direct voltage magnitude to be transformed, and aside from the bias excitation, a negative feedback excitation which is opposed to the controlling excitation as regards its effect upon the field plate or other galvanomagnetic resistor, the feedback excitation being controlled by the output current of the field plate, for example, through an amplifier. The negative feedback coupling greatly reduces the resultant field acting upon the field plate, for example, by the factor 100. This affords a reduction of measuring errors to the same extent. The principle of such a circuit equipped with a field plate, relating to its use for communication purposes, is described in Elektronik, 1967, No. 5, pages 137–138. In communication engineering the term (direct-current) isolating amplifiers is used; in all engineering, the devices operating on the same principle are often called "converters."

It is an object of our invention to devise a direct-current or direct-voltage transformer which will reliably operate even if subjected to overload without the necessity for the negative feedback excitation to increase in accordance with the increasing controlling excitation above the rated full value.

Another object of the invention is to reliably distribute the premagnetizing bias uniformly onto the field plates or other galvanomagnetic resistors of the transformer device.

Still another object of the invention is to afford the possibility of substituting costly, high-permeable magnetic materials, at least in part, by materials of higher saturation induction.

In the following, we shall apply the term direct-current transformer to devices of the type involved regardless of whether the device is to be used for transformation of currents or voltages, this usage being in accordance with general technology in this art.

To achieve the above-mentioned objects, and in accordance with a feature of our invention, a direct-current transformer having a bridge network of premagnetized galvanomagnetic resistors and winding means for providing a controlling excitation as well as a negative feedback excitation, is provided with a single magnetic circuit which is common to all of the galvanomagnetic resistors and the excitation and feedback winding means, and which at least on part of its perimeter and diagonal or cross section is formed of material that is magnetically saturated above a given maximum limit value of the negative feedback excitation.

In accordance with the present invention, a direct current transformer for a direct current having a magnetic control field comprises a bridge circuit having premagnetized field plates in the magnetic control field of the direct current. A direct current amplifier connected to the bridge circuit provides an output current which produces a feedback field which counteracts the magnetic control field. A single magnetic circuit is provided for the field plates of the bridge circuit and for the magnetic fields whereby a portion of the magnetic circuit which exceeds the magnetic control range required for the field plates to produce a feedback field may be magnetically saturated.

A magnetic circuit having a core with a variable cross-section is known. German published Document 1,003,267 discloses a magnetic amplifier with a common magnetic system including a load and control winding. The magnetic circuit has a bottleneck portion which is saturated during full control when a portion of the core is still unsaturated. This device maintains the time constant of the magnetic amplifier low.

In accordance with the invention, the magnetic saturation paths are designed in a manner whereby, during an overload, the magnetic premagnetizing field is reduced as little as possible and the field produced by the control winding is prevented from becoming high, if possible, relative to the remaining premagnetizing field, despite the excess current. Furthermore, in a control range below the reference current, the saturation paths should not impair the magnetic characteristics of the circuit.

According to one of the more specific features of the invention, we provide the magnetic cores in an organization as defined above with magnetic saturation paths. These are preferably so designed that in the event of overload the magnetomotive force of the premagnetizing bias is reduced as little as possible and further, that the MMF produced by the control winding does not become too large, in spite of the overload, in comparison with the remaining MMF of the premagnetization. Furthermore, the saturation paths are not to impair the magnetic properties of the magnetic circuit in a control region below the rated current.

By using a high series resistor, the current transformer can also be operated as a voltage transformer. In this case, the temperature dependence of the control winding, for example, a couple winding makes itself felt in the ratio of the winding voltage to the total voltage. This slight temperature dependence, however, can be compensated by means of a thermistor to more than 1% accuracy in a temperature range of $\Delta T=60° C$. A total voltage requirement for this purpose, however, will then be about 30% higher than the winding voltage.

Voltages of this magnitude are not always available. For example, a transformer that is to be connected across a shunt, can operate only with the voltage drop of the shunt. For such cases, our invention provides a voltage transformer in which the control winding is rated for the shunt voltage and is operated without special temperature compensation and hence, with its full temperature coefficient of resistivity. However, care is taken that the negative feedback winding possesses the same temperature coefficient. Instead of employing the negative feedback current as the output signal, the voltage at the negative feedback winding, or at another resistor of the same temperature coefficient in the circuit lead of the negative feedback winding, may serve as the output signal. In the latter case, the temperature coefficient on the input side and the output side will cancel each other if both windings have essentially the same temperature.

Thus, in the method of the invention for operating a direct current transformer having a control excitation winding and a feedback excitation winding made of the same material with the same temperature coefficient, both windings are maintained at the same temperature. A feedback circuit is maintained with the same temperature coefficient and at the same temperature as the feedback excitation winding. The output signal of the transformer is detected with the feedback excitation winding.

When providing saturation paths according to the invention in known separate magnetic circuits for the respective field plates, the difficulty is encountered that the saturation of the two cores (magnetic circuits), as a rule, will not always take place at exactly the same value of the controlling current. Consequently, the characteristics of a field plate may intersect each other even if the field plates themselves have the same dependency upon the magnetic field and, consequently, have the same respective characteristics for all magnetic field strengths. For this reason, the magnetic circuits of the field plates, according to the invention, are integrated through a single circuit, and the saturation portion is inserted into this circuit for both field plates.

The bridge network of the direct-current transformer may comprise, for example, two field plates and two fixed ohmic resistors, or it may contain four field plates. The field plates are mounted in air gaps of the magnetic circuit.

The premagnetizing bias of the field plates can be effected electrically. For this purpose, the magnetic circuit may be equipped with a bias winding which receives current from a constant-current source or from any suitable source through a constant-current regulating device. If desired, however, a less costly design is obtained by effecting the bias magnetization with the aid of one or several permanent magnets.

A premagnetizing bias effected with the aid of a permanent magnet is dependent upon temperature and this may result in zero-point instability. It is therefore another object of our invention to minimize or virtually eliminate the effect of an unstable magnetization resulting from a permanent magnet used for such bias purposes.

To this end, and in accordance with a further feature of our invention, the MMF of a permanent magnet, or the MMF of all magnets if several are used, is uniformly distributed over the field plates. The variation in the working point of the magnet then results in a uniform weakening or strengthening of the magnetic field in the respective field plates. Since the characteristics of these plates for physical reasons are always largely identical in the region of lower field strength, a shift in the working point of the bias magnet in a transformer device according to the invention causes no more than a very slight, and hence, negligible unbalance of the bridge network.

The above-mentioned and further objects, advantages, and features of our invention, said features being set forth with particularity in the claims annexed hereto, will be apparent from, and will be described in the following, with reference to embodiments of devices according to the invention illustrated by way of example on the accompanying drawing in which:

FIG. 1 is a partly sectional view of the transformer equipped with two field plates uniformly premagnetized by four permanent magnets.

FIG. 1*a* is a circuit diagram of a known type of direct current transformer.

Figure 4:
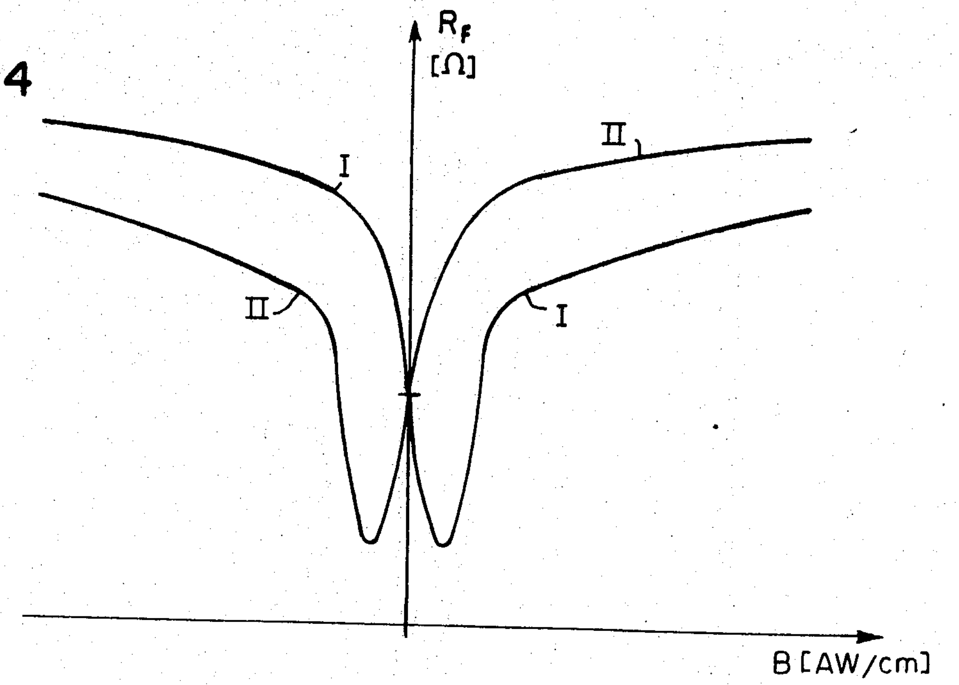
Figure 4A:
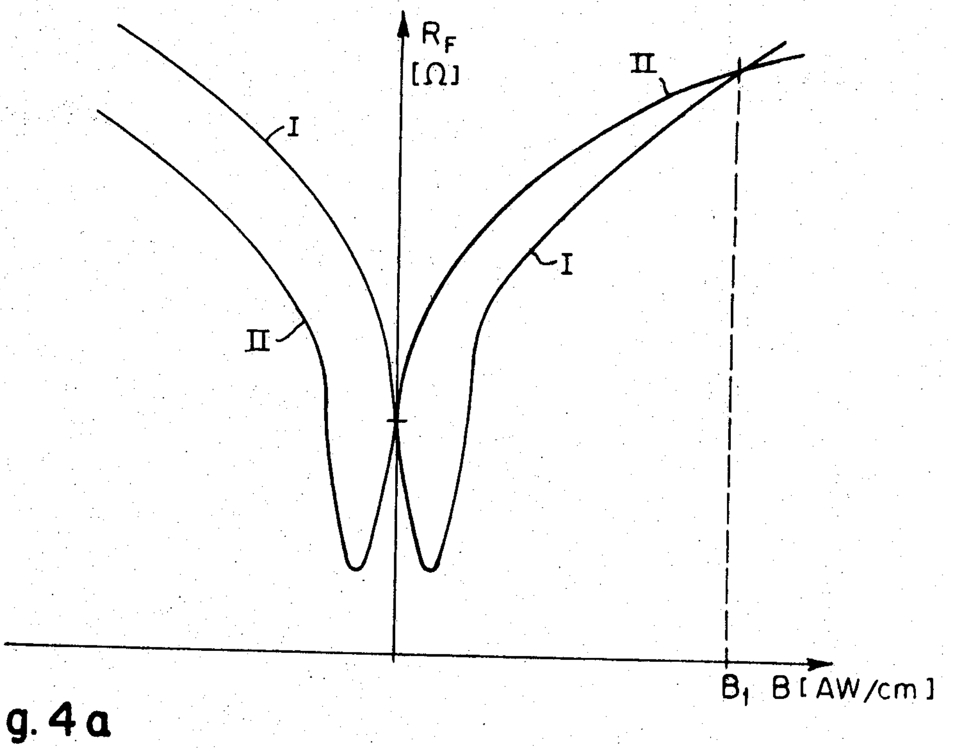

FIGS. 4 and 4*a* are graphical presentations of the characteristics of field plates.

Figure 5:
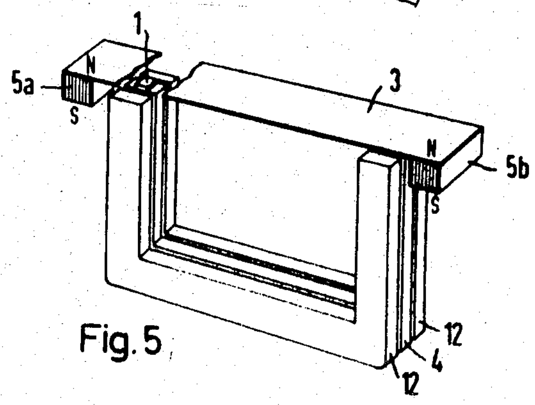

FIG. 5 is a perspective view of another embodiment of the direct current transformer of the invention, having stray laminations or sheets.

Figure 6:
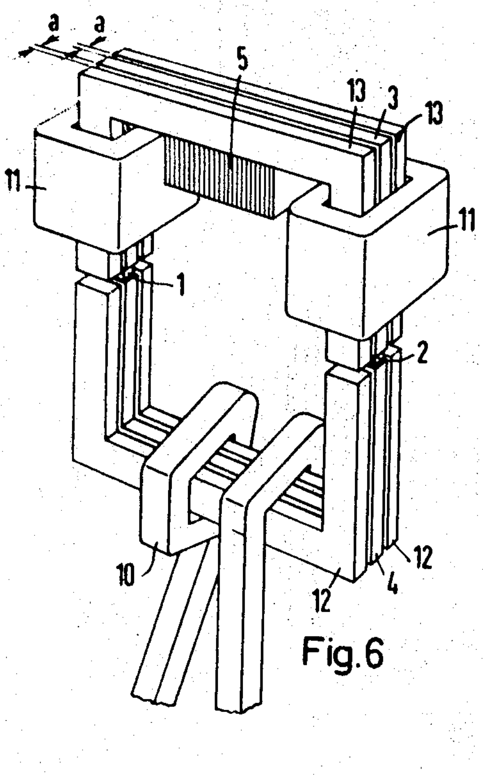

FIG. 6 is a perspective view of another embodiment of the direct current transformer of the invention, similar to the embodiment of FIG. 5 but symmetrically constructed.

Figure 7:
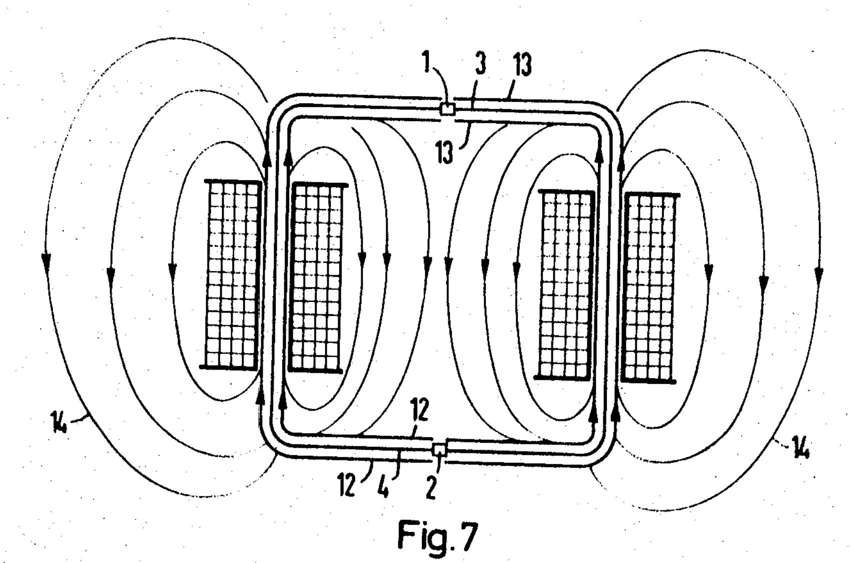

FIG. 7 is an explanatory diagram illustrating the stray field of a transformer.

Figure 8:
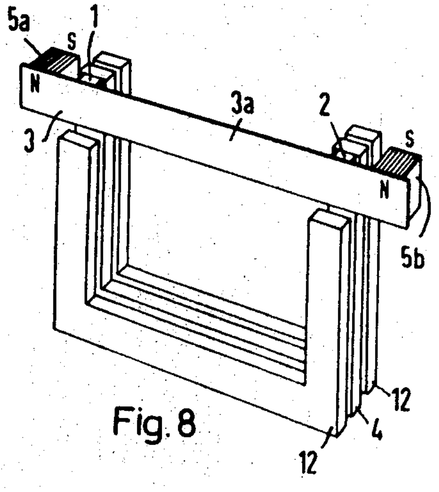

FIG. 8 is a perspective view of another embodiment of the direct current transformer of the invention having a saturation lamination or sheet which bears on the sides of the core ends.

Figures 9, 10:
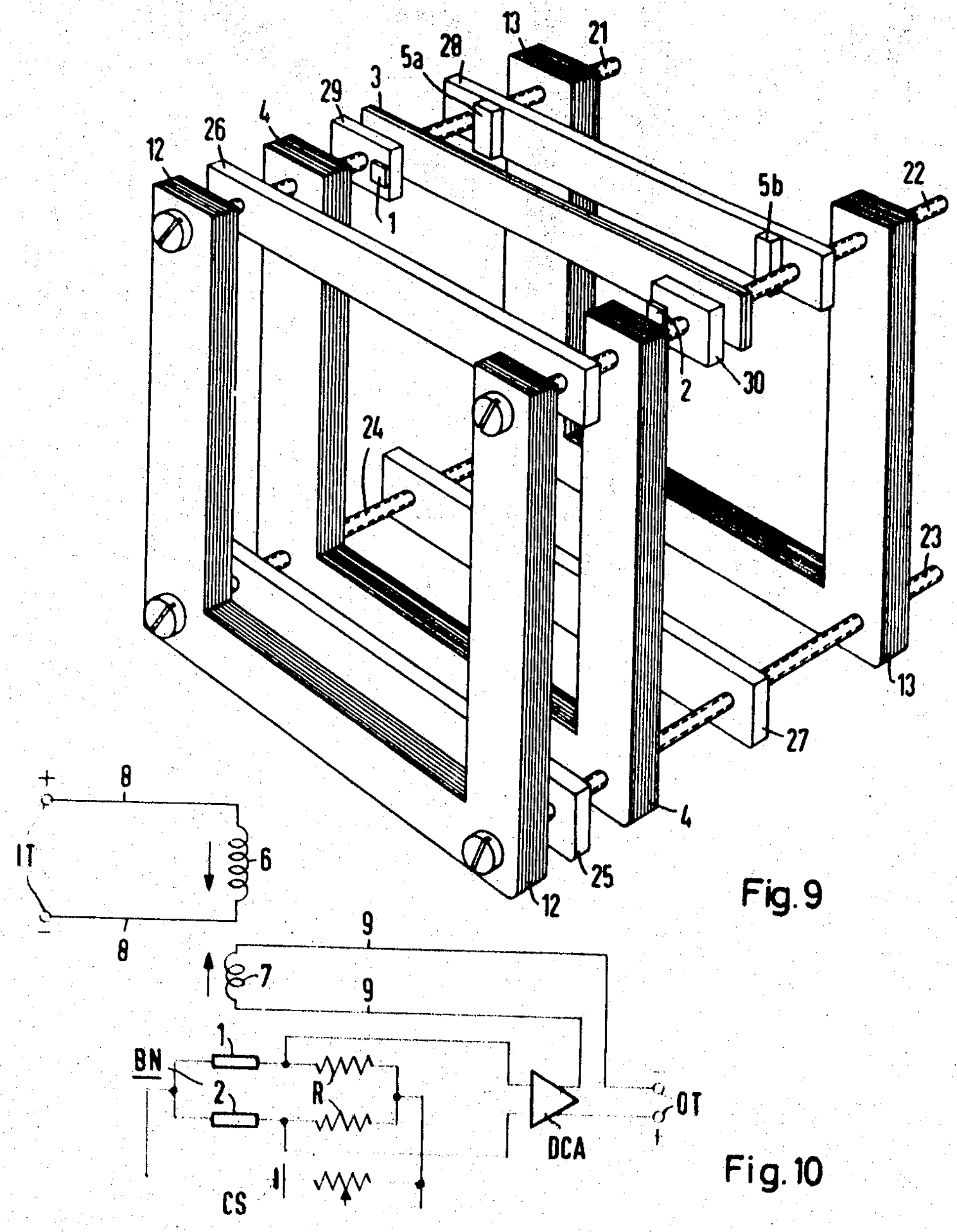

FIG. 9 is an exploded perspective view of another embodiment of the direct current transformer of the invention.

Figure 1:
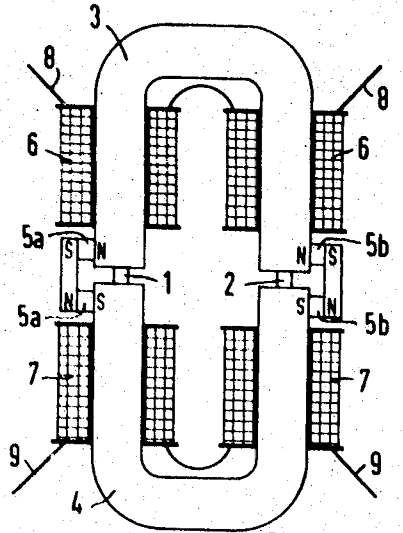
PRIOR ART Fig. 1

FIG. 10 is a circuit, diagram of the direct current transformer of the invention, of the embodiment of FIG. 1.

In the figures, the same components are identified by the same reference numerals.

In known direct current transformers, wherein a feedback field is opposed to the control field and acts on the field plate, it has been found preferable to always utilize two field plates, supplemented by two fixed resistors, to form a bridge circuit. This is frequently done, among other reasons, because the individual field plate frequency has a temperature-dependent resistance value and said resistance value cannot decrease below the basic resistance at zero induction. The magnetic windings of the control current or the direct current to be measured, are usually so constructed that an increase in current produces an increase in the resistance of one field plate and causes a decrease in resistance in the other field plate. This results in the bridge becoming unbalanced.

Although the feedback field is in anti-parallel relation to the control field in both field plates, the premagnetizing field is usually directed parallel to the control field in the one field plate and anti-parallel to the control field in the other field plate. The feedback windings may be adjusted via a DC amplifier such as, for example, a transistor amplifier, to the bridge output. The amplification is usually required because the bridge current and bridge voltage are relatively low.

Figure 1A:
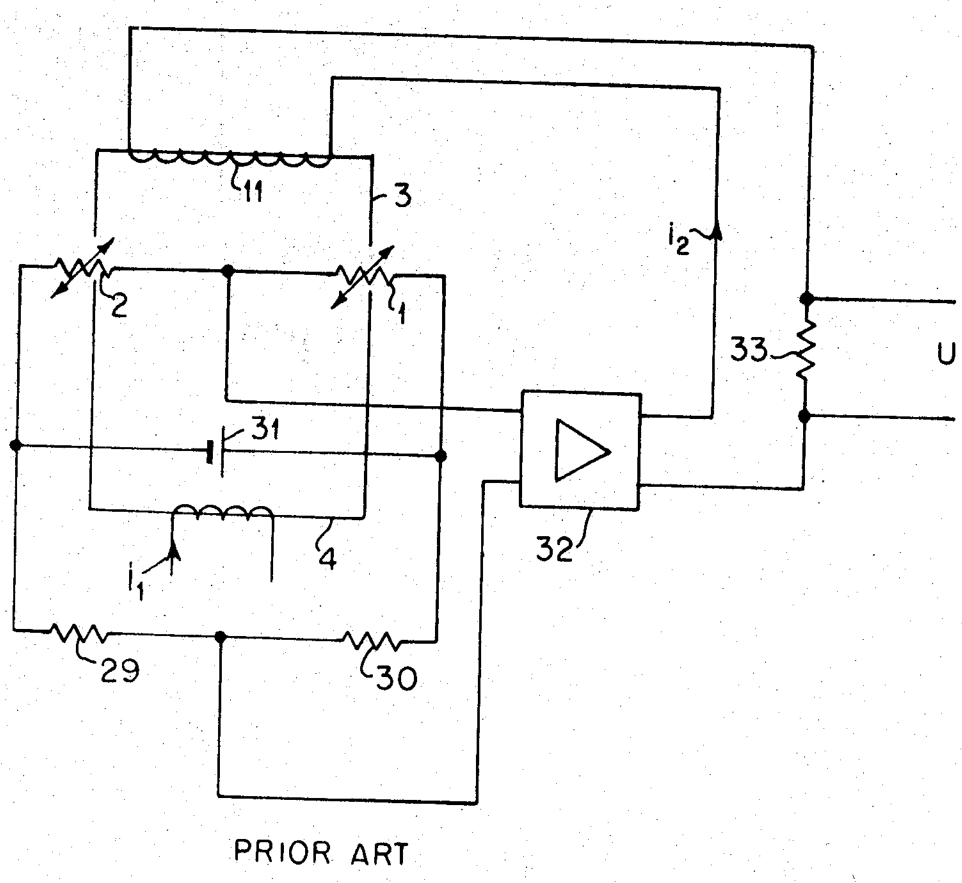

FIG. 1*a* is a circuit diagram of a known type of direct current transformer, as hereinbefore described. Two field plates 1 and 2 are affixed to a pair of fixed resistors 29 and 30 in a bridge circuit. The bridge circuit is supplied by voltage from a voltage source 31. The field plates 1 and 2 are positioned in the air gaps of a magnetic circuit comprising parts 3 and 4. The parts 3 and 4 comprise highly permealble material.

A winding 10 is wound on the part 4 of the magnetic circuit and conducts the control current. A transistor amplifier 32 is connected at the output diagonal conductor of the bridge circuit and controls a feedback winding 11. A voltage signal U is provided at a resistor 33. FIG. 1*a* does not show the premagnetizing means for the field plates 1 and 2. The field plates may be premagnetized either by electromagnetic means or by a permanent magnet, as indicated in the embodiment of FIG. 1.

Considerable shortcomings or disadvantages of the direct current transformer may appear during excess current operation, especially during short-circuits. Short-circuits are usual when the transformer functions as a current or voltage transformer in a shunt resistance, for measuring current. If the transformer is rated for a 100 AW control field, for each core having field plates, a short-circuit current which is 20 times the reference current produces a field of 2000 AW per core. Usually, the feedback cannot produce so high a field, since the direct current amplifier limits the feedback. When the limit is 200 AW, a field of 2000—200=1800 AW per core still applies for the indicated short-circuit. As a result, the distance from the operating or working point of the characteristic of both field plates of the bridge circuit (curves I and II of FIG. 4) adjusted by the premagnetization, becomes greater, and undesirable effects may result.

The undesirable effects are shown in FIG. 4*a*. If the field plates are premagnetized equally, in the opposite sense, for example, then the characteristic I is shifted to the right relative to the zero axis of the control field essentially by approximately as much, according to positive induction values, as the field plate characteristic II is shifted according to negative induction values, and a point of intersection C of the characteristic lines of both field plates is obtained. When the control field is zero, the feedback field is also zero.

Due to the deviating characteristics in the range of higher inductions B, the resistance curves or characteristics intersect a second time, at an induction $B_1$. This means that the voltage at the output of the bridge circuit, and thus also the input voltage at the amplifier and its output current, change their polarity as soon as the induction $B_1$ is exceeded. This is precisely what is prevented by our invention. The output current of the amplifier, constituting the useful signal, may not change its polarity for many uses, even for overcontrol such as, for example, grid-controlled rectifiers or grid control.

Figure 2:
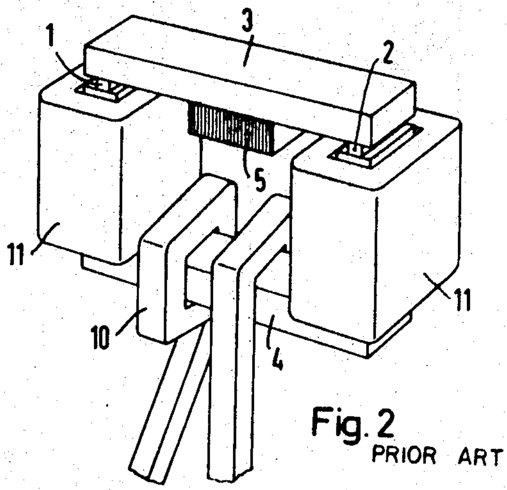
Fig. 2 PRIOR ART
FIG. 2 is a schematically perspective view of another transformer with two field plates uniformly premagnetized by a single permanent magnet.

FIGS. 1 and 2 illustrate known devices which may be utilized in the circuit of FIG. 1*a*. In FIGS. 1 and 2, two highly permeable parts 3 and 4 have air gaps of equal size. The highly permeable parts 3 and 4 hold the field plates 1 and 2. For the purposes of premagnetization magnets **5*a* and 5*b* are shown in FIG. 1. The magnitude of the premagnetizing field produced by the four magnets 5*a* and 5*b* and the magnets 5 in FIG. 2, is not essential, since as long as the highly permeable parts 3 and 4 are not saturated, the same magnetization is always produced at both air gaps and the same magnetic induction is produced in both field plates 1 and 2. The control winding 6, the feedback winding 7 and the terminals 8 and 9 of said windings are shown in FIG. 1. The windings 10 and 11** are shown in FIG. 2.

Figure 3:
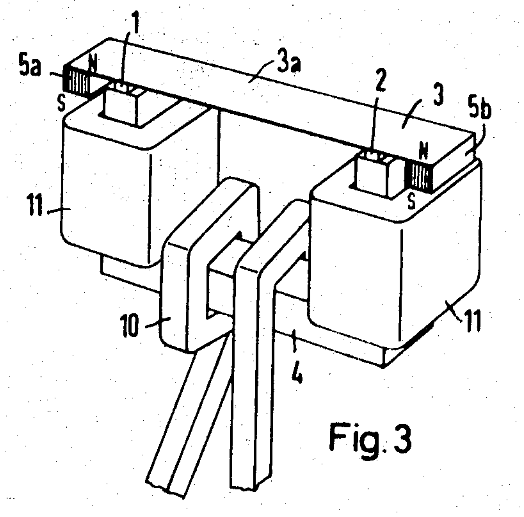
FIG. 3 is a perspective view of a further transformer designed with a saturation portion of reduced cross section in its magnetic circuit.

FIG. 3 illustrates an embodiment of a direct current transformer of the invention. The direct current transformer of FIG. 3 comprises two field plates 1 and 2. The premagnetization is provided by permanent magnets **5*a* and 5*b***. As in known transformers, the premagnetization may be accomplished by electromagentic means, without losing the advantage of homogenous premagnetization of the field plates.

For this purpose, the magnetic circuit may be provided with one or more additional bias windings which are energized from a source of normally constant but preferably adjustable voltage, or the bias voltage may be superimposed upon one of the windings that supply the controlling excitation and the feedback excitation, such as one of the windings 6 and 7 in FIG. 1. Electrical premagnetization, on account of its easy adjustability, provides for improved flexibility of the device.

The device according to FIG. 3 is similar to those of FIG. 1 and FIG. 2 in that the MMF of permanent magnets **5*a* and 5 *b* is applied to two air gaps of the same size and width in which two field plates 1 and 2 of the same type are located. The middle portion 3*a* of the highly permeable yoke 3 and the likewise highly permeable yoke 4 have the effect that no magnetic voltage difference can become effective between the air gaps. The performance of the magnetic circuit according to FIG. 3 differs from that of FIG. 2 mainly by the fact that the middle portion 3*a* in FIG. 3, on account of its reduced cross section, will be readily saturated. The difference of the magnetomotive forces of the magnets 5*a* and 5*b* is to have only such a magnitude, that the middle portion 3*a* remains far below saturation even if this difference has its highest value, so that the middle portion 3*a* will remain highly permeable. This is favorable for a substantially fault-free performance of the transformer device. During operation of the transformer the middle portion 3*a* is not to become saturated as long as the rated control is not exceeded. However, when the transformer operates under excessive overload conditions, and consequently, after the negative feedback coupling has attained its highest permissible value and the effective magnetomotive force of the magnetic circuit increases very rapidly, the middle portion 3***a* is supposed to be saturated as soon as possible.

FIG. 4 represents the resistance characteristic of field plates which were taken with a device as shown in FIG. 3 and in which the yoke 3, inclusive of its metal portion 3*a*, consisted of Mu-metal having a thickness of 0.35 mm. and a width of 10 mm. Indicated along the abscissa is the magnetic field B of a current flowing through 1740 turns and acting upon the field plates, the field being in terms of ampere turns per centimeter (AW/cm.). The ordinate indicates the ohmic resistance $R_F$ of the field plate. On account of the high permeability of the yokes 3 and 4, the steep gradient of the curves remains preserved in the rated region of the transformer, the effective MMF being in most cases below 1 AW/cm. Saturation of the middle portion 3*a* results in the resistance curves I and II of the field plates 1 and 2 not intersecting at higher magnitudes of MMF.

The magnets 5*a* and 5*b* in FIG. 3 may also be mounted on the middle portion 3*a* (see FIG. 2) as long as the middle portion 3*a* is not oversaturated at the point where the flux from the permanent magnet enters.

The magnetic circuit according to FIG. 3 carries all windings on the yoke 4. That is, none of the windings are arranged on the yoke 3. A winding on yoke 3 might cause undesired saturation phenomena due to stray. The saturable portion 3*a*, however, is to respond only to differences between the magnetomotive forces caused respectively by the control winding and the feedback winding. On the other hand, it would be advantageous if the largest possible portion of the magnetic circuit had a small cross section, because then the saturation due to overload current would be more complete, and remanent induction of the magnetic circuit which constitutes an error effect with respect to the correct measuring or transforming operation would be reduced. For given dimensions of the air gaps and field plates, the latter having in some cases a substrate of ferro-magnetic material, a smaller cross section of the yokes 3 and 4 would result in a smaller remanent field. Furthermore, a reduced cross section of these parts, consisting of high-quality magnetic material, may also lead to an appreciable reduction in cost.

As mentioned, an excessively small cross section of the transformer structures which carry the windings would cause undesired saturation due to stray fields. Therefore, according to a further feature of our invention, the stray flux of the windings is caught by separate sheets which may be made of cheaper material and which preferably have a high saturation induction. In FIG 5, partially shown in section, the parts 3 and 4 constitute the magnetic circuit proper, this circuit being closed through the field plates of which only the field plate 1 is illustrated. The closed magnetic circuit has a small cross section and generally consists of high-quality material of slight coercive force. The parts denoted by 12 are the above mentioned stray sheets which catch the stray flux of the windings. It is advantageous to give the magnetic circuit the shape UU according to FIG. 6. In this embodiment the stray sheets are denoted by 12 and 13.

FIG. 7 serves to schematically explain the catching of the stray flux 14 by the stray or catch sheets 12 and 13. Without these sheets the stray flux would result in saturating the yokes 3 and 4 of the magnetic circuit. The latter may have a smaller cross section as well as a lower saturation induction than the sheets 12 and 13. The premagnetization by electric means or permanent magnets is not shown in FIG. 7.

The stray sheets 12 and 13 may be located upon the parts 3 and 4 which are designed as core sheets. Only the inevitable air gaps then remain effective between the parts 12 and 4 as well as between the parts 13 and 3. According to FIG. 6, it is sometimes advisable to increase the mutual spacing up to the amount *a* so that the poorer hysteresis properties of the stray sheets will not be transferred to the high-quality magnetic circuit. The interspace *a*, for example, may be designed as a mechanical buffer layer which receives the pressure caused by shrinking when the otherwise finished device is encapsulated by imbedding it in casting plastic. High-quality magnetic materals must be shielded from excessive pressure. The interspaces, denoted by *a* in FIG. 6 may also be filled with a good heat conducting material or with a heat conducting buffer layer in order to effect a temperature compensation between the individual sheets.

FIG. 8 shows a magnetic circuit whose design is similar to that shown in FIG. 5. The difference resides in the fact that in FIG. 8 the field plates are located not on ground front faces of the stack of laminations, but that the field plates are located between the originally smooth surfaces of stack sheets.

The embodiment according to FIG. 9 corresponds to that shown in FIG. 8. Four bolts 21 to 24 carry a U-shaped laminated stray sheet 12, two copper strips 25 and 26, a U-shaped laminated core sheet 4 of highly permeable material, two spacer pieces 29 and 30 of brass which carry the field plates 1 and 2, a laminated and highly permeable core sheet 3 (saturation portion), two copper strips 27 and 28 and also U-shaped laminated stray sheet 13. The copper strips 25 to 28 are provided as spacers which fill the interspaces *a* according to FIG. 6. Attached to the copper sheet 28, according to FIG. 9, are two permanent magnets 5*a* and 5*b* for premagnetizing the field plates 1 and 2. The differently thick highly permeable stacks 3 and 4 of core sheets may be made of Mu-metal, for example. When the nuts (not shown) on the bolts 21 and 24 are tightened, the parts shown exploded in FIG. 9 are firmly pressed against each other. In an embodiment built in accordance with FIG. 9, the device had defined dimensions. The U legs were about 25 mm. long and were spaced 35 mm. from each other. The width of the device measured parallel to the bolts 21 to 24 was about 12 mm. The highly permeable stack 4 was composed of seven laminations. The stack 3 had two laminations. The magnetic circuit with the outer catch sheets and the intermediate sheets, with or without buffer layer, may also be produced by winding a tape core. The catch sheets may also consist of a material different from that used for the inner sheets.

The direct current transformer with field plates and magnetic negative feedback according to the invention is suitable for positive and negative control purposes, provided that the direct current amplifier that energizes the feedback also furnishes the positive and negative output current.

An example of a complete electrical circuit for a device as shown in FIG. 1 or FIG. 2, or as shown in any of FIGS. 3 to 9, is illustrated in FIG. 10, where the same reference numerals are applied as in FIG. 1. It will be seen that the control winding 6 has its leads 8 connected to input terminals IT through which the direct current to be measured or transformed is passed through the winding 6 in order to produce the controlling ampere turns (MMF). The negative feedback winding 7 has its leads 9 connected to the output terminals OT of the device in series with the output circuit of a direct-current amplifier DCA, the latter being energized at its input circuit from the output diagonal of a bridge network BN whose four branches contain the field plates 1, 2 and two fixed resistors R. The bridge network is energized at its input diagonal from a constant current source CS.

To those skilled in the art it will be obvious upon a study of this disclosure that our invention permits of, various modifications that may be given embodiments other than particularly illustrated herein, without departing from the essential features of the invention and within the scope of the claims annexed hereto.

We claim:

1. A direct current transformer for a direct current having a magnetic control field, said transformer comprising a bridge circuit having premagnetized field plates in the magnetic control field of said direct current;

a direct current amplifier connected to said bridge circuit and providing an output current which produces a feedback field which counteracts the magnetic control field;

a single magnetic circuit for the field plates of said bridge circuit and for magnetic fields whereby a portion of the magnetic circuit which exceeds the magnetic control range required for the field plates to produce a feedback field may be magnetically saturated.

2. A direct current transformer as claimed in claim 1, wherein said field plates are separately premagnetized and said field plates are rated in a manner whereby a difference of the pregmagnetizing fields is below the saturation field of said magnetic circuit.

3. A direct current transformer as claimed in claim 1, wherein said single magnetic circuit comprises a plurality of parts, one of said parts having a cross section smaller than that of the other parts of said magnetic circuit whereby said one part becomes magnetically saturated before said remaining parts when said field increases.

4. A direct current transformer as claimed in claim 1, wherein said magnetic circuit comprises a portion of material of high permeability, said field means has at least one premagnetizing field, and said portion of high permeability distributes said premagnetizing field uniformly over said field plates.

5. A direct current transformer as claimed in claim 1, wherein said bridge circuit comprises two field plates and two fixed resistors.

6. A direct current transformer as claimed in claim 1, wherein said magnetic control field has a stray part and said magnetic circuit comprises a core of highly permeable material comprising attached laminations of high saturation induction for catchng the stray part of said magnetic control field and of said feedback field.

7. A direct current transformer as claimed in claim 6, further comprising a layer of non-magnetic material interposed between said laminations and said core, the material of said layer having good heat conducting properties.

8. A direct current transformer as claimed in claim 7, wherein said layer is adapted to mechanically buffer said core and said laminations.

9. A direct current transformer as claimed in claim 7, wherein said layer is adapted to conduct heat between said core and said laminations.

10. The method of operating a direct current transformer having a control excitation winding and a feedback excitation winding made of the same material with the same temperature coefficient, said method comprising the steps of maintaining both windings at the same temperature;

maintaining a feedback circuit with the same temperature coefficient and at the same temperature as the feedback excitation winding; and detecting the output signal of said transformer with said feedback excitation winding.

References Cited

UNITED STATES PATENTS

| | | | |
|---|---|---|---|
| 3,172,032 | 3/1965 | Hunt | 323—66 |
| 3,320,520 | 5/1967 | Pear, Jr. | 323—94(HX) |
| 3,401,257 | 9/1968 | Lang | 323—94(H) |
| 3,406,332 | 10/1968 | Hieronymus | 323—94(HX) |

J D MILLER, Primary Examiner

G. GOLDBERG, Assistant Examiner

U.S. Cl. X.R.

323—94; 324—46, 98